United States Patent [19]

Brookshier

[11] Patent Number: 4,634,986

[45] Date of Patent: Jan. 6, 1987

[54] LOG AMPLIFIER WITH POLE-ZERO COMPENSATION

[75] Inventor: William Brookshier, Downers Grove, Ill.

[73] Assignee: The United States of America as represented by the United States Department of Energy, Washington, D.C.

[21] Appl. No.: 699,878

[22] Filed: Feb. 8, 1985

[51] Int. Cl.[4] ........................ G06G 7/24; G06F 7/556

[52] U.S. Cl. .................................... 328/145; 307/491; 307/492

[58] Field of Search ................................ 307/450–452; 328/141–145

[56] References Cited

U.S. PATENT DOCUMENTS

| | | | |
|---|---|---|---|
| 3,037,129 | 5/1962 | LeBel | 307/492 |
| 3,237,028 | 2/1966 | Gibbons | 307/492 |
| 3,252,007 | 5/1966 | Saari | 307/492 |
| 3,392,287 | 7/1968 | McFadyen et al. | 307/490 |
| 3,448,289 | 6/1969 | Harris | 307/490 |
| 3,584,232 | 6/1971 | Wallace, Jr. | 328/145 |
| 4,147,989 | 4/1979 | Brolde | 328/142 |
| 4,341,962 | 7/1982 | Buff | 328/145 |
| 4,434,380 | 2/1984 | Welland | 307/492 |

*Primary Examiner*—Stanley D. Miller
*Assistant Examiner*—B. P. Davis
*Attorney, Agent, or Firm*—Walter L. Rees; Paul A. Gottlieb; Judson R. Hightower

[57] ABSTRACT

A logarithmic amplifier circuit provides pole-zero compensation for improved stability and response time over 6–8 decades of input signal frequency. The amplifier circuit includes a first operational amplifier with a first feedback loop which includes a second, inverting operational amplifier in a second feedback loop. The compensated output signal is provided by the second operational amplifier with the log elements, i.e., resistors, and the compensating capacitors in each of the feedback loops having equal values so that each break point or pole is offset by a compensating break point or zero.

8 Claims, 2 Drawing Figures i
INPUT
11
12
26
24
22
V3
V1
20
18
16
V4
14
V2
28
10
OUTPUT

GAIN
10^5
10^4
10^3
10^2
10
1
10^-1
10^-2
10^-3
Z2/Z1
V2/V3
B1
B2
V1/V3
A1
A2
B1 & B2 (V1/V2)
0.1 1 10 10^2 10^3 10^4 10^5 10^6 10^7 10^8
FREQUENCY (Hz)

LOG AMPLIFIER WITH POLE-ZERO COMPENSATION

CONTRACTUAL ORIGIN OF THE INVENTION

The United States Government has rights in this invention under Contract No. W-31-109-ENG-38 between the U.S. Department of Energy and Argonne National Laboratory.

BACKGROUND OF THE INVENTION

This invention relates generally to amplifier circuits and is particularly directed to an arrangement for improving the stability and response time of a logarithmic amplifier.

A logarithmic amplifier (hereinafter referred to as a log amplifier) is a voltage amplifier having a large gain for small input signals and a reduced, although never zero, gain for larger signals. The ideal log amplifier provides an output voltage proportional to the logarithm of the input voltage. Such amplifiers are used in a wide range of applications because of their capability to handle a wide range of input signal amplitudes without becoming saturated. The typical log amplifier employs negative feedback that varies in magnitude with input signal level and permits the amplifier to operate in a stable manner over a wide input signal level range.

Where an amplifier with feedback performs a linear mathematical operation upon the input signal, the shunt impedance of the feedback loop does not change radically and amplifier stability is easily achieved. However, if the shunt impedance is variable to any appreciable extent, as in a log amplifier where the transfer characteristic of the feedback path ($\beta$) varies with signal amplitude, the stability of the circuit may be severely affected over a wide input signal bandwidth. Amplifier stability may be improved by increasing the time constant of the circuit. However, increasing the amplifier circuit's time constant necessarily extends its response, or recovery, time. The response time may be defined as that period, following an excessively large input signal, during which a small input signal will be masked and will not appear at the amplifier's output. Therefore, these apparently mutually exclusive, yet highly desirable, log amplifier characteristics present a paradox to the circuit designer and represent an inherent limitation in log amplifiers.

The present invention avoids the limitations of the prior art and thus represents an improvement thereover by providing a log amplifier which affords a short response time with a high degree of amplifier stability without sacrificing one of these characteristics at the expense of the other. This is accomplished in the log amplifier of the present invention by an arrangement which provides uniform pole-zero compensation for all of the poles or zeros within the amplifier circuit.

OBJECTS AND SUMMARY OF THE INVENTION

Accordingly, it is an object of the present invention to provide an improved log amplifier.

It is another object of the present invention to improve the stability and response time of a log amplifier by offsetting each break point or pole therein with a compensating break point or zero.

Yet another object of the present invention is to compensate for variations in the transfer characteristic of a first feedback loop of a log amplifier with changes in input signal frequency by providing transfer characteristic variation compensation by means of a second feedback loop within the first feedback loop.

A further object of the present invention is to provide a circuit having a highly accurate logarithmic transfer characteristic over a wide range of input signal frequencies.

A still further object of the present invention is to provide a novel compensated amplifier circuit for generating highly accurate nonlinear functions over a wide range of input signal frequencies and amplitudes.

Accordingly, the present invention contemplates a log amplifier circuit wherein the poles and zeros vary with input signal amplitude and which includes a compensating circuit which provides pole-zero compensation which exactly tracks the variation of poles and zeros in the main amplifier circuit. The log amplifier circuit includes a first operational amplifier with a negative feedback loop. A second compensating operational amplifier is coupled to the negative feedback loop and forms a second feedback loop for improved stability and response time over 6–8 decades of input signal amplitude. The log elements, resistors (R) and compensating capacitors (C) of the two feedback loops have related values ($R_2=R_3=R_4$ and $C_1=C_4$, $C_2=C_3$) so that each break point or pole is offset by a compensating break point or zero.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF PREFERRED EMBODIMENT

Figure 1:
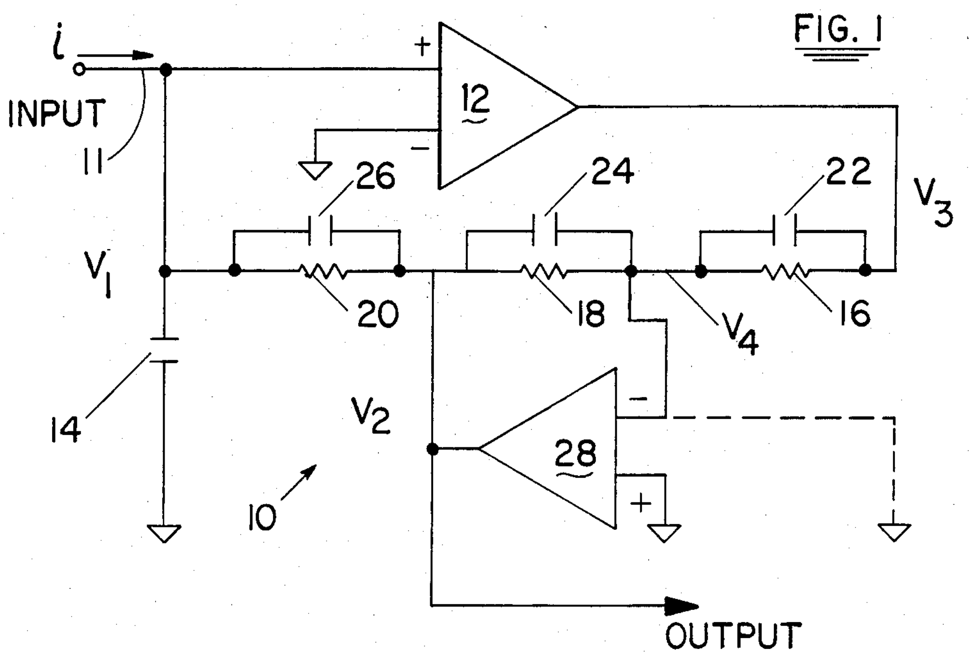
FIG. 1 is a simplified schematic diagram of a log amplifier with pole-zero compensation in accordance with the present invention.

Referring to FIG. 1, there is shown a simplified schematic diagram of a compensating log amplifier 10 in accordance with the present invention.

The log amplifier 10 includes a first operational amplifier 12 to the positive input terminal of which is provided an input signal having a current i. The negative input terminal of the first operational amplifier 12 is coupled to the circuit common, or neutral ground potential. A negative feedback loop is coupled between the positive input terminal of the first operational amplifier 12 and its output and includes three parallel resistor-capacitor arrangements coupled in series and respectively comprised of resistor 16 and capacitor 22, resistor 18 and capacitor 24, and resistor 20 and capacitor 26. Because the input impedance at the positive input terminal of the first operational amplifier 12 is very high, the positive input to this operational amplifier functions as a voltage sensing lead such that the input signal voltage $V_1$ is applied across the parallel combination of resistor 20 and capacitor 26. Grounded capacitor 14 represents a distributed capacitance within the cable 11 coupled to the positive input terminal of the first operational amplifier 12 and by means of which the input signal is provided thereto.

A second operational amplifier 28, along with resistors 16, 18 and capacitors 22, 24, forms an inverting amplifier feedback loop such that the polarity of the output signal $V_2$ of the second operational amplifier is always inverted, or opposite, to that of the output signal $V_3$ of the first operational amplifier 12. Because of this inversion, the input connections to the first operational amplifier 12 are reversed relative to the manner in which they would be connected if the second operational amplifier 28 did not perform an inverting function.

The operation of the compensating log amplifier 10 of FIG. 1 can be expressed as a network function in the form of a quotient of polynomials in accordance with conventional network analysis. The roots of the network function are expressed in terms of complex frequencies ($s_1, s_2, \ldots, s_n$). Complex frequencies which cause the network function to vanish are called "zeros" of the network function, while those complex frequencies which cause the network function to become infinite are termed "poles" of the network function. A network function may be completely specified by its poles, zeros, and a scale factor. Thus, the poles and zeros designate critical frequencies in terms of natural complex frequencies corresponding to free oscillations as well as to driving-force complex frequencies corresponding to forced oscillations. Oscillations arising from nonlinearities within the compensating log amplifier 10 degrade its stability and extend its response time. The present invention compensates for the inherent nonlinearity of the log element, i.e., resistor 20, within the negative feedback loop for improving the performance of the log amplifier.

For successive pole-zero compensation, approximately the same current must flow through all three log elements, i.e., resistors 16, 18 and 20, which possess closely-matched voltage-current characteristics. That approximately the same current flowing through each of the aforementioned log elements will provide pole-zero compensation can be shown by the following. The input signal current i flows through resistor 20 and produces an output voltage $V_2$ corresponding to the voltage-current characteristics of the resistor 20 log element. However, the voltage $V_2$ also appears across resistor 18 because the negative input terminal of the second operational amplifier 28 is maintained at virtual ground. Therefore, if resistors 18 and 20 are matched in terms of their voltage-current characteristic, the current through resistor 18 will match the input signal current i. Furthermore, since resistors 16 and 18 are in series, essentially the same current flows through both of these resistances. Thus, currents approximately equal to the input signal current i flow through resistors 16 and 18, as well as through resistor 20.

Figure 2:
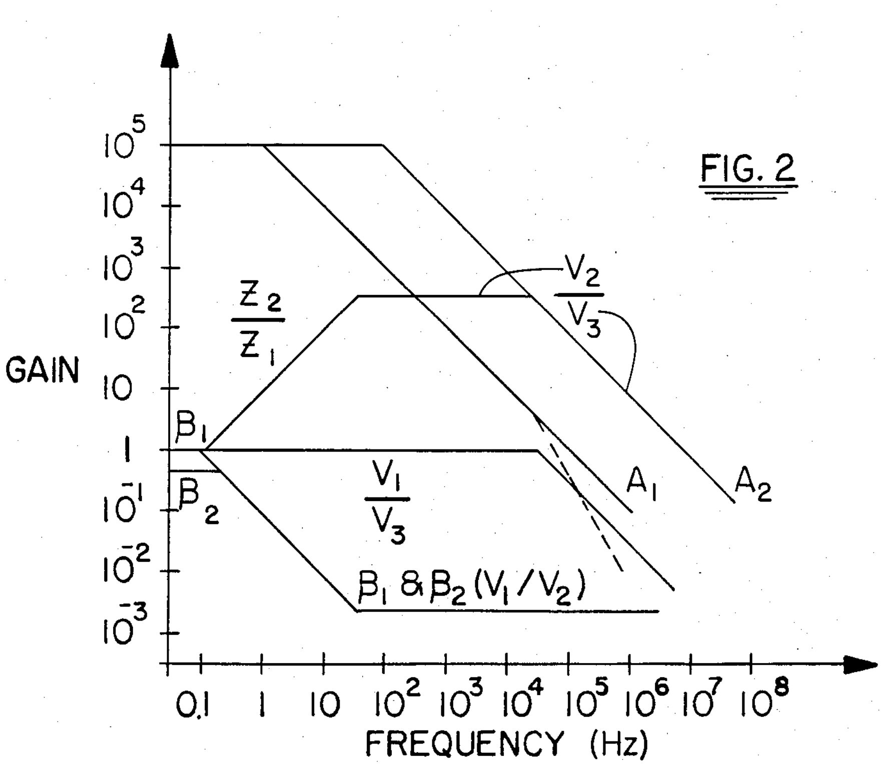
FIG. 2 shows the compensation of the transfer function provided by the log amplifier shown in FIG. 1.

As the input signal current i changes, the dynamic or incremental resistance of each resistive log element follows along and tracks that of each of the others because they each possess closely-matched voltage-current characteristics. With this condition established, pole-zero compensation can be designed with assurance that as the poles or zeros move along the frequency scale, such as in a frequency vs. gain plot as shown in FIG. 2, due to the changing input signal current i, all of the poles and zeros will move along the frequency scale in unison. Pole-zero compensation can be designed at any selected input current level and it will hold true for all such values.

Since it has been established that the currents through the three log element resistors 16, 18 and 20 are very closely matched, it may be assumed that their incremental resistances are similarly matched. There is a pole associated with the resistor 20-capacitor 14 product which can be compensated by the zero associated with resistor 16-capacitor 22 product, requiring the capacitances of capacitors 14 and 22 to be equal. There is also a zero associated with the resistor 20-capacitor 26 product which can be compensated by the pole associated with the resistor 18-capacitor 24 product, requiring the capacitances of capacitors 26 and 24 to be equal.

The transfer function through the main feedback network which includes capacitors 14 and 26 as well as resistor 20 is plotted as $\beta_1$ (equal to $V_1/V_2$) in FIG. 2. The compensating network is represented by the transfer function $V_2/V_3$ also plotted in FIG. 2. The combined effect of these two networks is obtained by taking their product, which yields a horizontal line at unity gain over most of the frequency range. For the various curves plotted in FIG. 2, the value of the incremental resistance of the log element resistors 16, 18 and 20 is taken as 5,000 megohms, which is a typical value for basic element pairs at an input current level of $10^{-11}$ amperes (A). It is assumed that capacitors 14 and 22 equal 300 picofarads (pf), while capacitors 24 and 26 are each 1 pf. The 300 to 1 ratio between these two capacitance values accounts for the 300 to 1 gain dropoff in $\beta_1$ (or $V_1/V_2$), and also accounts for the 300 to 1 increase in the gain for $V_2/V_3$. The plot for $V_2/V_3$ cannot extend beyond the open-loop gain plot for the second operational amplifier 28, so that the compensation is effective up to the frequency at which the $V_2/V_3$ and the second operational amplifier 28 ($A_2$) plots merge between $10^4$ and $10^5$ Hz.

As the signal input current increases in value, the incremental resistance of all three log element resistors 16, 18 and 20 decreases in unison resulting in a change in the curves shown in FIG. 2 as indicated by the dotted line therein. The transfer function indicated by the dotted line in FIG. 2 corresponds to a signal current increase of two decades in magnitude to $10^{-9}$ A, with the overall ratio $V_1/V_3$ remaining unchanged.

There has thus been shown a log amplifier with pole-zero compensation which provides stable operation over an 8 decade current range of between approximately $10^{-11}$ and $10^{-3}$ A and which also exhibits a short response time over this current range. The log amplifier of the present invention employs two operational amplifiers having partially common feedback loops, with one feedback loop entirely within the other. The resistive log elements all have the same value, while compensating pairs of capacitors similarly have equal values.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A log amplifier circuit responsive to an input signal current for developing an amplified output signal and characterized by poles and zeros which vary with the input signal amplitude, said log amplifier circuit comprising:

a first operational amplifier having an input terminal to which the input signal current is provided and an output terminal at which a first voltage is developed;

a first feedback network coupled between the input terminal of said first operational amplifier and an intermediate point and including a nonlinear log element across which a second voltage which varies with the input signal current is developed; and a second feedback network including a second inverting operational amplifier coupled between the output terminal of said first operational amplifier and said intermediate point and responsive to said first voltage for developing a compensation signal and applying said compensation signal to said first feedback network in generating a compensated feedback signal at the input terminal of said first operational amplifier.

2. The log amplifier circuit of claim 1 wherein said nonlinear log element in said first feedback network includes a first log resistor and said second feedback network includes second and third log resistors coupled in series with one another and with said first log resistor.

3. The log amplifier circuit of claim 2 wherein said first, second and third log resistors are all of equal value.

4. The log amplifier circuit of claim 3 wherein said first feedback network further includes a first grounded capacitor coupled between the input terminal of said first operational amplifier and said first log resistor and a second capacitor coupled in parallel with said first log resistor and said second feedback network further includes third and fourth capacitors respectively coupled in parallel with said second and third log resistors.

5. The log amplifier circuit of claim 4 wherein said first and fourth capacitors are of equal value and said second and third capacitors are of equal value.

6. The log amplifier circuit of claim 5 wherein said first capacitor represents the distributed capacitance in an input line coupled to the input terminal of said first operational amplifier by means of which the input signal current is provided to said first operational amplifier.

7. The log amplifier circuit of claim 6 wherein said second and third capacitors represent the stray capacitances within said first and second feedback networks, respectively.

8. The log amplifier circuit of claim 1 wherein the input signal current is provided to the positive input terminal of said first operational amplifier and said first voltage is provided to the negative input terminal of said second inverting operational amplifier.

* * * * *